US011461155B2

(12) United States Patent
Gadepalli et al.

(10) Patent No.: US 11,461,155 B2
(45) Date of Patent: Oct. 4, 2022

(54) METHOD AND SYSTEM FOR PREDICTING AN OCCURRENCE OF A FAILURE CONDITION IN A VDI ENVIRONMENT

(71) Applicant: Wipro Limited, Bangalore (IN)

(72) Inventors: Satya Sairam Gadepalli, Hyderabad (IN); Seshu Venkata Gudepu, Hyderabad (IN)

(73) Assignee: Wipro Limited, Bangalore (IN)

( * ) Notice: Subject to any disclaimer, the term of this patent is extended or adjusted under 35 U.S.C. 154(b) by 135 days.

(21) Appl. No.: 17/009,902

(22) Filed: Sep. 2, 2020

(65) Prior Publication Data

US 2021/0373985 A1 Dec. 2, 2021

(30) Foreign Application Priority Data

May 31, 2020 (IN) .............................. 202041022822

(51) Int. Cl.
*G06F 11/00* (2006.01)
*G06N 20/00* (2019.01)
*G06F 9/455* (2018.01)

(52) U.S. Cl.
CPC ........ *G06F 11/008* (2013.01); *G06F 9/45558* (2013.01); *G06N 20/00* (2019.01); *G06F 2009/45591* (2013.01)

(58) Field of Classification Search
CPC .... G06F 11/008; G06F 9/45558; G06F 9/455; G06F 9/452; G06F 2009/45591; G06N 20/00

USPC ........................................................ 714/1–57
See application file for complete search history.

(56) References Cited

U.S. PATENT DOCUMENTS

| 8,875,129 | B2 | 10/2014 | Wagner et al. |
| 9,189,308 | B2 | 11/2015 | Young et al. |
| 9,479,414 | B1 | 10/2016 | Rustad |
| 2005/0065678 | A1* | 3/2005 | Smith .................... G06Q 10/00 701/1 |
| 2008/0235757 | A1* | 9/2008 | Li ........................ G06F 9/45558 726/1 |
| 2008/0270838 | A1* | 10/2008 | Dorai ...................... G06F 9/546 714/38.14 |

(Continued)

*Primary Examiner* — Sarai E Butler
(74) *Attorney, Agent, or Firm* — Finnegan, Henderson, Farabow, Garrett & Dunner, LLP (57) ABSTRACT

The present disclosure is related to Virtual Desktop Infrastructure (VDI) that discloses a method and system for predicting an occurrence of a failure condition in a VDI environment. A failure prediction system simulates a workload condition, to generate a functional experience corresponding to each information system. Thereafter, the failure prediction system determines a deviation in, performance patterns of each information system, and the functional experience corresponding to each information system, based on historical data of the corresponding information system and transactional data of an enterprise. Finally, an occurrence of a failure condition in a VDI environment is predicted by performing predictive analytics on the determined deviation, based on one or more benchmark metrics. The present disclosure rectifies the performance issues based on the prediction, which in turn prevents the occurrence of the failure condition, thereby improving user experience and productivity in the VDI environment.

17 Claims, 4 Drawing Sheets

(56) References Cited

U.S. PATENT DOCUMENTS

| | | | |
|---|---|---|---|
| 2010/0088549 A1* | 4/2010 | Duffield | H04L 47/2475 |
| | | | 706/54 |
| 2016/0014238 A1* | 1/2016 | Massa | H04L 43/50 |
| | | | 714/33 |
| 2017/0322827 A1* | 11/2017 | Little | G06F 11/301 |
| 2020/0241894 A1* | 7/2020 | Li | G06F 9/45558 |
| 2020/0327034 A1* | 10/2020 | Chellappan | G06F 11/3466 |

* cited by examiner

METHOD AND SYSTEM FOR PREDICTING AN OCCURRENCE OF A FAILURE CONDITION IN A VDI ENVIRONMENT

TECHNICAL FIELD

The present subject matter is related in general to Virtual Desktop Infrastructure (VDI), and more particularly, but not exclusively to a method and system for predicting an occurrence of a failure condition in a VDI environment.

BACKGROUND

Generally, VDI (Virtual Desktop Infrastructure) is a technology used to create a virtualized desktop environment on a remote server setup. The VDI segments one or more servers into various virtual desktops, which a user may access remotely through their computing devices. Such virtual desktops may be hosted on Virtual Machines (VMs), which are controlled through management software. The VDI provides freedom to the user for accessing a user's desktop from anywhere at any time through a VDI client software. The VDI is classified as persistent VDI and non-persistent VDI. The persistent VDI is generally customized for a personal user, which enables the user to log in to a same virtual desktop each time. However, the non-persistent VDI includes virtual desktops that revert to an initial state when the user logs out.

Though VDI is advantageous to the users, VDI environment faces several challenges due to one or more performance issues related to network, storage, security stack and the like. Generally, VDI performance is unpredictable due to multiple external factors like network, application performance, active directory, security software, storage and the like, which impact user experience, leading to ignorance of VDI performance issues. Further, various VDI teams which investigate the VDI environment to identify performance issues, fail to solve the performance issue, in real-time, which highly impacts user productivity and business performance.

One of the existing techniques discloses technologies for differentiating normal operation of an application program from error conditions to predict, diagnose, and recover from application failures. This technique involves monitoring access to resources by the application program, and logging the resource access events. Thereafter, resource access patterns are established from the logged resource access events utilizing computer pattern recognition techniques. When subsequent access to resources by the application program deviates from the established patterns, then a user and/or administrator of the application program is notified of a potential error condition based on the detected deviation. However, this technique monitors the application program through the pattern recognition techniques which take significant amount of time to troubleshoot and diagnose complex application performance issues. Therefore, this technique fails to predict a failure condition, rather notifies upon occurrence of the failure condition which leads to poor user experience.

Yet another existing technique discloses a monitoring agent, which is installed in a production environment for monitoring patterns of events associated with the application performance and user experience in the virtual infrastructure. This technique generates alerts upon detecting the pattern of events associated with performance degradation. However, even this technique fails to determine and notify respective application owner or infrastructure element owner on potential performance degradation in their respective components in advance, to prevent occurrence of issues.

Therefore, the existing techniques monitor application performance in the VDI environment for the purpose of investigation and generate one or more reports post investigation. However, none of the existing techniques address the end user performance issue, in real-time, which affects the user productivity and business performance Moreover, the existing techniques do not possess sufficient intelligence on aspects such as when to monitor or what to monitor at a particular point of time, which results in collection and analysis of large amount of unnecessary data that slows down the system. Therefore, there is a need to address the performance issues in the VDI environment, in real-time.

The information disclosed in this background of the disclosure section is only for enhancement of understanding of the general background of the disclosure and should not be taken as an acknowledgement or any form of suggestion that this information forms prior art already known to a person skilled in the art.

SUMMARY

Disclosed herein is a method of predicting an occurrence of a failure condition in a Virtual Desktop Infrastructure (VDI) environment. The method includes simulating, by a failure prediction system, a workload condition, to generate a functional experience corresponding to each of one or more information systems. Simulating the workload condition includes performing one or more simulated end user transactions using the one or more information systems. Further, the method includes determining a deviation in, one or more performance patterns of each of the one or more information systems, and the functional experience corresponding to each of the one or more information systems, based on historical data of the corresponding one or more information systems and transactional data of an enterprise. Subsequently, the method comprises predicting an occurrence of a failure condition in a VDI environment, by performing predictive analytics on the determined deviation, based on one or more benchmark metrics.

Further, the present disclosure includes a failure prediction system for predicting an occurrence of a failure condition in a Virtual Desktop Infrastructure (VDI) environment. The failure prediction system includes a processor and a memory communicatively coupled to the processor. The memory stores the processor-executable instructions, which, on execution, causes the processor to simulate a workload condition, to generate a functional experience corresponding to each of one or more information systems. Simulating the workload condition includes performing one or more simulated end user transactions using the one or more information systems. Further, the processor is configured to determine a deviation in, one or more performance patterns of each of the one or more information systems, and the functional experience corresponding to each of the one or more information systems, based on historical data of the corresponding one or more information systems and transactional data of an enterprise. Subsequently, the processor is configured to predict an occurrence of a failure condition in a VDI environment, by performing predictive analytics on the determined deviation, based on one or more benchmark metrics.

Furthermore, the present disclosure discloses a non-transitory computer readable medium including instructions stored thereon that when processed by at least one processor causes a failure prediction system to perform operations comprising simulating a workload condition, to generate a functional experience corresponding to each of one or more information systems. Simulating the workload condition includes performing one or more simulated end user transactions using the one or more information systems. Further, the instructions cause the processor to determine a deviation in, one or more performance patterns of each of the one or more information systems, and the functional experience corresponding to each of the one or more information systems, based on historical data of the corresponding one or more information systems and transactional data of an enterprise. Finally, the instructions cause the processor to predict an occurrence of a failure condition in a VDI environment, by performing predictive analytics on the determined deviation, based on one or more benchmark metrics.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

The present disclosure provides a method and a system for predicting an occurrence of a failure condition in a Virtual Desktop Infrastructure (VDI) environment. A failure prediction system may simulate a workload condition, to generate a functional experience corresponding to each of one or more information systems. In some embodiments, simulating the workload condition may include, performing one or more simulated end user transactions using the one or more information systems. Further, the failure prediction system may determine a deviation in, one or more performance patterns of each of the one or more information systems, and the functional experience corresponding to each of the one or more information systems, based on historical data of the corresponding one or more information systems and transactional data of an enterprise. In some embodiments, the failure prediction system may obtain the transactional data of the enterprise, from at least one virtualization layer, at first predefined time intervals. In some embodiments, the transactional data is indicative of a workload pattern of the enterprise. Furthermore, the failure prediction system may predict an occurrence of a failure condition in the VDI environment, by performing predictive analytics on the determined deviation, based on one or more benchmark metrics. In some embodiments, the failure prediction system may generate one or more actionable insights upon predicting the occurrence of the failure condition in the VDI environment. Thereafter, the failure prediction system may notify the one or more actionable insights to a service provider associated with the VDI environment, to prevent the occurrence of the failure condition in the VDI environment.

The present disclosure predicts performance degradation or issues of a particular service in the VDI environment, in real-time, which helps in preventing the occurrence of the failure condition. Also, the present disclosure helps in taking proactive actions to eliminate performance issues well in advance, thereby not allowing end users to face any issues related to network, storage, computation and the like, in the VDI environment. Overall, the present disclosure ensures real-time servicing of the VDI environment, that improves the user experience and productivity, and prevents business loss that may occur due to occurrence of various performance issues.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Figure 1:
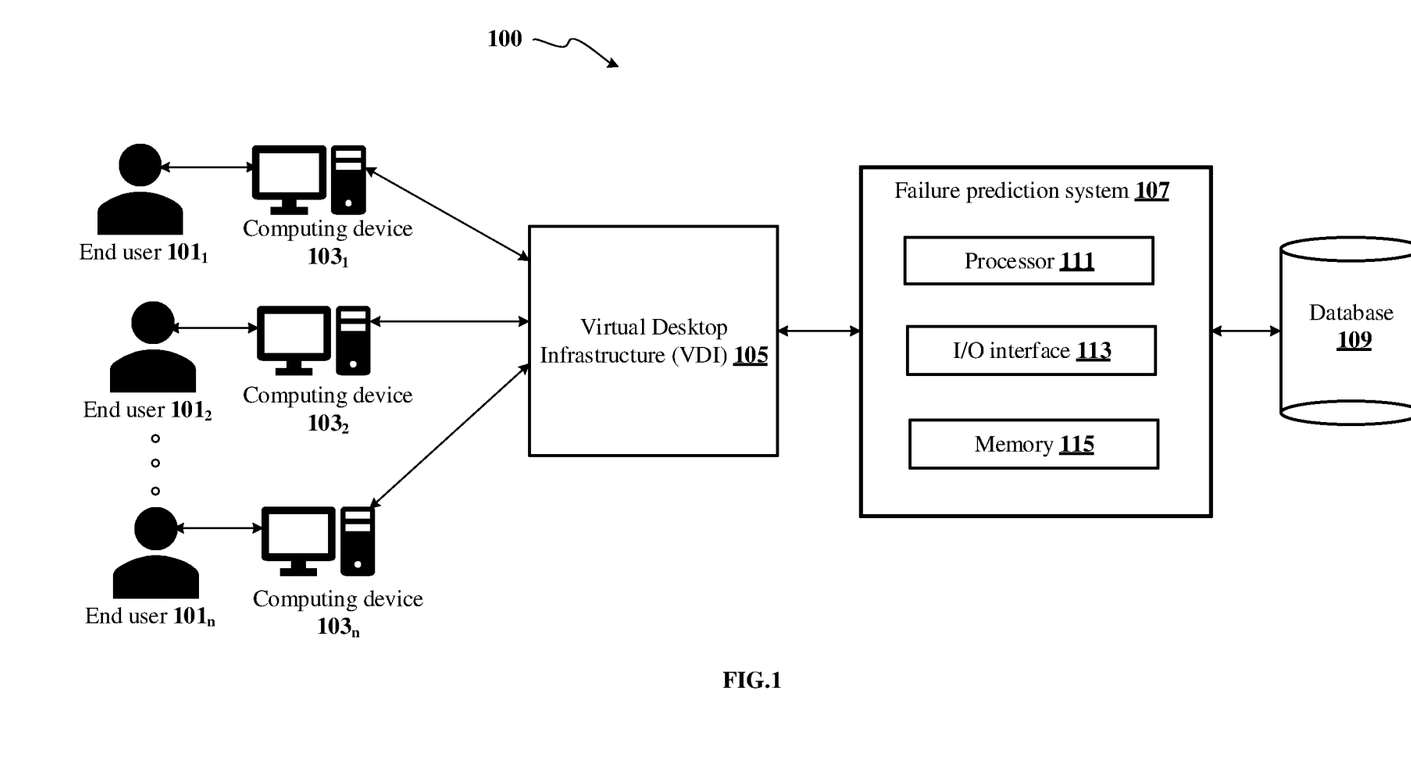
FIG. 1 shows an exemplary architecture for predicting an occurrence of a failure condition in a Virtual Desktop Infrastructure (VDI) environment in accordance with some embodiments of the present disclosure.

FIG. 1 shows an exemplary architecture for predicting an occurrence of a failure condition in a Virtual Desktop Infrastructure (VDI) environment in accordance with some embodiments of the present disclosure.

The architecture 100 includes end user $101_1$ to end user $101_n$ (also referred to as one or more end users 101), computing device $103_1$ to computing device $103_n$ (also referred to as one or more computing devices 103), a Virtual Desktop Infrastructure (VDI) 105 (also referred to as VDI environment 105), a failure prediction system 107 and a database 109. The one or more end users 101 may be associated with the VDI 105 via a communication network (not shown in the FIG. 1), using the corresponding one or more computing devices 103. The communication network may be a wireless communication network. In some embodiments, the VDI 105 segments one or more servers (not shown in the FIG. 1) that are part of the VDI 105, into a plurality of virtual desktops (not shown in the FIG. 1) that are hosted one a plurality of virtual machines (not shown in the FIG. 1). The one or more end users 101 may access the plurality of virtual desktops of the VDI 105 from a remote location, through their corresponding one or more computing devices 103.

Further, the failure prediction system 107 may be associated with the VDI 105 via the wireless communication network. In some embodiments, the failure prediction system 107 may be a virtual assistant, which interacts with the VDI 105 in a manner similar to the one or more end users 101, in other words, the virtual assistant may be a end user 101. In some embodiments, failure prediction system 107 may be configured at an outermost virtualization layer among all the virtualization layers, which have to be traversed to interact with the VDI 105. As an example, the virtualization layers may be related to computation, storage and network. In some other embodiments, the failure prediction system 107 may be configured at any one of the virtualization layers based on requirement. In some embodiments, multiple instances of the virtual assistant may be used based on requirement. As an example, one instance of the virtual assistant may be used for performing HR operations, while another instance of the virtual assistant may be used for performing front office operations.

The failure prediction system 107 may include, a processor 111, an Input/Output (I/O) interface 113 and a memory 115. The I/O interface may receive historical data from a database 109 associated with the failure prediction system 107. In some embodiments, the historical data may include, but not limited to, one or more previously identified performance patterns, performance metrics, standard deviations, change in measurements within a time slot and baseline shifts related to one or more information systems. The processor 111 may simulate a workload condition, to generate a functional experience corresponding to each of one or more information systems. In some embodiments, the one or more information systems may be applications which are accessed by the one or more end users 101 of an enterprise, through the VDI 105. In some embodiments, simulating the workload condition may include, performing one or more simulated end user transactions using the one or more information systems. Further, the processor 111 may determine a deviation in, one or more performance patterns of each of the one or more information systems, and the functional experience corresponding to each of the one or more information systems, based on the historical data of the corresponding one or more information systems and transactional data of an enterprise. In some embodiments, the transactional data is indicative of a workload pattern of the enterprise. In some embodiments, the transactional data of the enterprise may include, but not limited to, workload data related to at least one of, the one or more information systems used by the one or more end users 101 of the enterprise, one or more servers hosting the one or more information systems, one or more service protocols and one or more communication gateways.

Upon determining the deviation, the processor 111 may predict an occurrence of a failure condition in the VDI environment 105, by performing predictive analytics on the determined deviation, based on one or more benchmark metrics. In some embodiments, the processor 111 may generate one or more actionable insights upon predicting the occurrence of the failure condition in the VDI environment 105. Thereafter, the processor 111 may notify the one or more actionable insights to a service provider associated with the VDI environment 105, to prevent the occurrence of the failure condition in the VDI environment 105.

Figure 2:
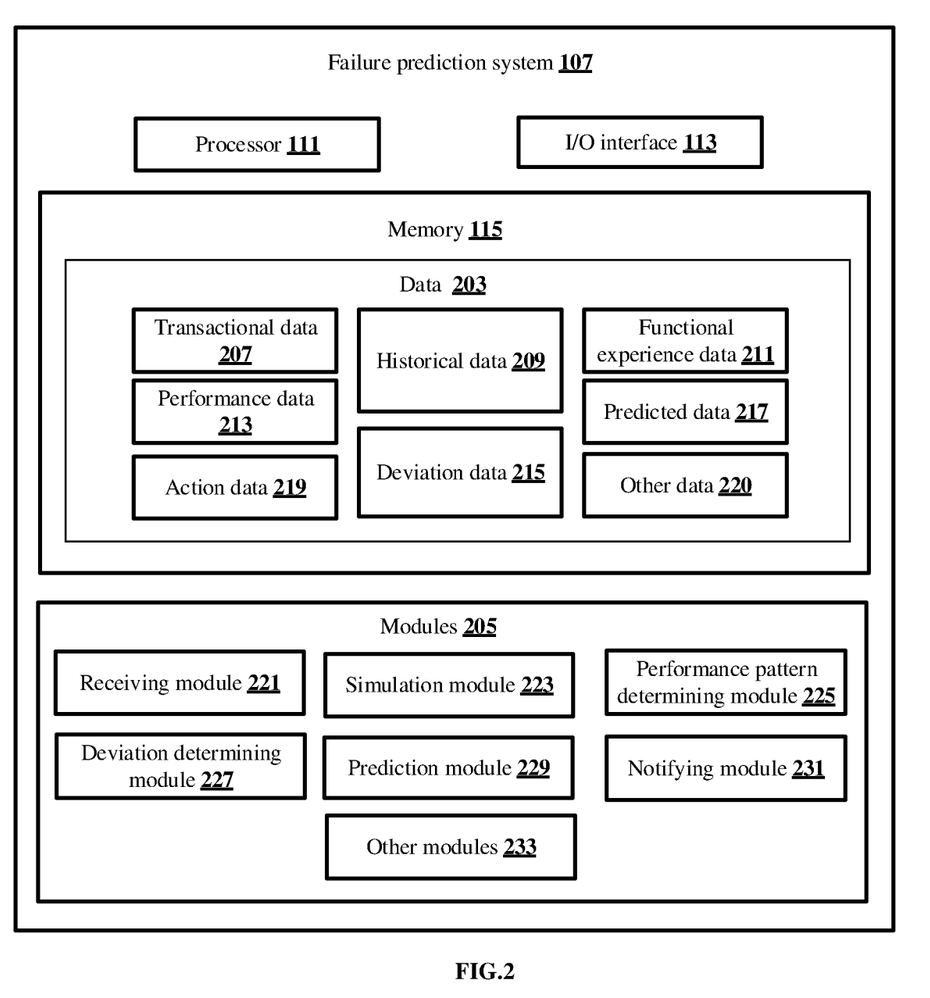
FIG. 2 shows a detailed block diagram of a failure prediction system for predicting an occurrence of a failure condition in a Virtual Desktop Infrastructure (VDI) environment in accordance with some embodiments of the present disclosure.

FIG. 2 shows a detailed block diagram of a failure prediction system for predicting an occurrence of a failure condition in a Virtual Desktop Infrastructure (VDI) environment in accordance with some embodiments of the present disclosure.

In some implementations, the failure prediction system 107 may include data 203 and modules 205. As an example, the data 203 is stored in the memory 115 configured in the failure prediction system 107 as shown in the FIG. 2. In one embodiment, the data 203 may include transactional data 207, historical data 209, functional experience data 211, performance data 213, deviation data 215, predicted data 217, action data 219 and other data 220.

In some embodiments, the data 203 may be stored in the memory 115 in form of various data structures. Additionally, the data 203 can be organized using data models, such as relational or hierarchical data models. The other data 220 may store data, including temporary data and temporary files, generated by the modules 205 for performing the various functions of the failure prediction system 107.

In some embodiments, the data 203 stored in the memory 115 may be processed by the modules 205 of the failure prediction system 107. The modules 205 may be stored within the memory 115. In an example, the modules 205 communicatively coupled to the processor 111 configured in the failure prediction system 107, may also be present outside the memory 115 as shown in FIG. 2 and implemented as hardware. As used herein, the term modules 205 may refer to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In some embodiments, the modules 205 may include, for example, a receiving module 221, a simulation module 223, a performance pattern determining module 225, a deviation determining module 227, a prediction module 229, a notifying module 231, and other modules 233. The other modules 233 may be used to perform various miscellaneous functionalities of the failure prediction system 107. It will be appreciated that such aforementioned modules 205 may be represented as a single module or a combination of different modules.

In some embodiments, the receiving module 221 may receive transactional data 207 indicative of a workload pattern of the enterprise, from at least one virtualization layer. In some embodiments, the transactional data 207 may be received at first predefined time intervals. As an example, the first predefined intervals may be time of a day, a day of a week, a week of a month, a month of a year and the like. As an example, the transactional data 207 may include, but not limited to, workload data related to at least one of, the one or more information systems used by one or more end users 101 of the enterprise, one or more servers hosting the one or more information systems, one or more service protocols and one or more communication gateways. Further, the receiving module 221 may receive historical data 209 from a database 109 associated with the failure prediction system 107. As an example, the historical data 209 may include, but not limited to, one or more previously identified performance patterns, performance metrics, standard deviations, change in measurements within a time slot and baseline shifts related to one or more information systems.

In some embodiments, the simulation module 223 may simulate a workload condition, to generate a functional experience corresponding to each of the one or more information systems. In some embodiments, simulating the workload condition may include, but not limited to, performing one or more simulated end user transactions using the one or more information systems. As an example, the one or more simulated end user transactions may include, but not limited to, application launch operation, login operation, read operation, write operation and submit operation. The one or more simulated end user transactions are just exemplary and should not be considered as limiting, as the simulation module 223 may be capable of simulating other operations related to the VDI 105, apart from the operations mentioned above. The functional experience may be response generated by the simulation module 223 upon executing the one or more simulated end user transactions. In some embodiments, the functional experience generated by the simulation module 223 corresponding to each of the one or more information systems is quantified by a measure of time consumed at each virtualization layer, to execute each of the one or more simulated end user transactions. As an example, when the failure prediction system 107 is configured at the outermost virtualization layer and simulates the workload condition, the time consumed at each virtualization layer i.e. at each virtualization layer corresponding to computing, storage and network, is determined. As an example, when the failure prediction system 107 is configured at the virtualization corresponding to storage, then the time consumed for performing one or more simulated end user transactions is determined only at the virtualization layer corresponding to storage. Therefore, the failure prediction system 107 may be configured at any virtualization layer based on the requirement. In some embodiments, the simulation module 223 may perform the simulation at second predefined time intervals. In some embodiments, the second predefined time intervals may be set based on criticality of the one or more information systems to the enterprise. As an example, the criticality of the one or more information systems may be categorized as Bronze, Silver and Gold. The one or more information systems belonging to the category "Gold" may be considered to be highly critical to the enterprise. Therefore, the second predefined time intervals for such one or more information systems may be set to, for example, 1 hour. Similarly, the one or more information systems belonging to the category "Silver" may be considered to be mediocre level critical to the enterprise. Therefore, the second predefined time intervals for such one or more information systems may be set to, for example, 2-4 hours. Similarly, the one or more information systems belonging to the category "Bronze" may be considered to be less critical to the enterprise. Therefore, the second predefined time intervals for such one or more information systems may be set to, for example, 2 hours in a day. In some embodiments, the functional experience generated based on simulation is stored as functional experience data 211.

Further, in some embodiments, a performance pattern determining module 225 may determine one or more performance patterns of each of the one or more information systems performing transactions of each of the one or more end users 101. In some embodiments, the performance pattern determining module 225 may determine one or more performance patterns dynamically, by continuously monitoring each of the one or more information systems used by one or more end users 101 of the enterprise. The one or more performance patterns may include, but not limited to, performance of the one or more information systems, and one or more virtual desktops used for performing the one or more end user transactions. In some embodiments, the one or more end user transactions may be performed between a service providing enterprise (i.e. service provider of the VDI 105) and the one or more end users 101 residing in a different geographical location i.e. a remote location. Further, the performance pattern determining module 225 may determine performance metrics related to the one or more information systems based on the corresponding one or more performance patterns. In some embodiments, the performance metrics may be computed in the presence of at least one of a load condition and a no load condition. The performance metrics of the one or more information systems may indicate time taken by each of the one or more information systems for achieving a specific performance In some embodiments, the one or more performance patterns and the performance metrics of each of the one or more information systems may be stored as the performance data 213.

Further, in some embodiments, the deviation determining module 227 may determine a deviation in one or more performance patterns of each of the one or more information systems, and the functional experience corresponding to each of the one or more information systems, based on the historical data 209 received from the database 109, and the transactional data 207. As an example, the deviation determining module 227 may determine the deviation by comparing the one or more performance patterns and the functional experience of the one or more information systems, with the one or more previously identified performance patterns and previously identified functional experience of the corresponding one or more information systems respectively. In some embodiments, the previously identified functional experience of the one or more information systems may be received from the database 109. Further, as an example, the one or more performance patterns and the functional experience of the one or more information systems may be correlated with the transactional data of the enterprise to infer the overall performance deviation of the one or more information systems. In some embodiments, the determined deviation may be stored as the deviation data 215.

Further, in some embodiments, the prediction module 229 may predict an occurrence of a failure condition in the VDI environment 105 by performing predictive analytics on the determined deviation. In some embodiments, the predictive analytics may be performed using at least one statistical techniques related to data mining, predictive modelling and machine learning. Further, techniques used for performing predictive analytics may include, but not limited to, linear regression technique, nonlinear regression technique, neural network technique, support vector machines, decision trees and the like. The prediction module 229 may perform the predictive analytics based on one or more benchmark metrics. In some embodiments, the one or more benchmark metrics may be predefined. In some other embodiments, the one or more benchmark metrics may be determined, in real-time, based on the historical data of the one or more information systems. In some embodiments, the one or more benchmark metrics may vary based on capacity of the VDI environment 105 and number of sessions of the one or more information systems running in real-time. As an example, the one or more benchmark metrics may be predefined for conditions such as "no load", "under provisioning load", "optimum provisioning load" and "over provisioning load". Based on the capacity of the VDI environment 105 and the number of sessions running in real-time, values of the one or more benchmark metrics may shift. The one or more benchmark metrics may be threshold values of performance metrics, under different conditions as mentioned above.

In some embodiments, the prediction module 229 may correlate the determined deviation with Red Amber Green (RAG) values of each performance metric and one or more benchmark metrics, to predict an occurrence of a failure condition. The failure condition thus predicted may be stored as predicted data 217. The below Table 1 shows exemplary performance metric and exemplary RAG values for each performance metric.

TABLE 1

| Performance metric | Green | Amber | Red |
|---|---|---|---|
| Round Trip Time | | | |
| Latency | | | |
| Logon Duration | 30 Seconds | 60 Seconds | >90 Seconds |
| Network Latency | | | |
| Bandwidth | | | |
| Frames Per Second | | | |
| App Launch Time | 3 Seconds | 3-10 Seconds | 10-30 Seconds |
| Disk Queue | | | |
| Storage IOPS(local disks, LUNs on a SAN, Storage Spaces or SMB) | | | |
| User Input Lag | 16 ms | 20 ms | 1000 ms |

In the above Table 1, R-A-G values of the performance metric "Logon Duration" is "greater than 90 secs", "60 sec" and "30 sec", respectively. "Green" denotes a favourable value, "Amber" denotes a neutral value and "Red" denotes an unfavourable value.

In some embodiments, the prediction module 229 may determine RAG values of performance metrics when no users are using one or more information systems, and values of performance metrics when peak level users are using the one or more information systems, either in real-time, or may retrieve previously determined values from the database 109.

Further, in some embodiments, upon predicting the occurrence of a failure condition in the VDI environment 105, the notifying module 231 may generate one or more actionable insights corresponding to the failure condition, in real-time. The below Table 2 shows exemplary failure conditions and one or more exemplary actionable insights for each exemplary failure conditions.

TABLE 2

| Sl. no | Predicted failure condition | Actionable insights |
|---|---|---|
| 1. | Overload | 1. Increase capacity of the VDI<br>2. Move end users to a different region<br>3. Shut down services which are less critical and make space for business critical services |
| 2. | Under utilized | 1. Decrease capacity |

The one or more actionable insights thus generated may be stored as the action data 219. Upon generating the one or more actionable insights, the notifying module 231 may notify the one or more actionable insights to a service provider associated with the VDI environment 105, to prevent the occurrence of the failure condition in the VDI environment 105. In some embodiments, the notifying module 231 may notify in the form of real-time alerts. In some other embodiments, the notifying module 231 may notify by generating one or more reports in real-time.

Henceforth, the process of predicting an occurrence of a failure condition in VDI environment 105 is explained with the help of one or more examples for better understanding of the present disclosure. However, the one or more examples should not be considered as limitation of the present disclosure.

Consider an enterprise "A" provides a "check-in" Application for an airline company. Consider the number of end users for the "check-in" Application at time "X" is 10. Consider that the total capacity of the VDI environment 105 that hosts the "check-in" Application is "25". The failure prediction system 107 may simulate a workload condition, such as, a login operation performed by 13 additional end users, and generate a functional experience. The below Table 3 shows a series of operations based on which the failure prediction system 107 predicts occurrence of a failure condition.

TABLE 3

| Sl. no | Series of operations | Number of users | Value |
|---|---|---|---|
| 1 | Time taken to login | For 10 users | is 30 seconds |
| 2 | Simulation: Time taken to login | For additional 13 users (total 10 + 13 = 23 users) | is 75 seconds |
| 3 | Benchmark value: | For 25 users | Maximum should be 60 seconds |
| 4 | Historic data: Time taken to login | For 23 users | Was 55 seconds |
| 5 | Deviation of login time between Sl. no 2 and 3 | — | 15 seconds |
| 6 | Deviation of login time between Sl. no 2 and 4 | — | 20 seconds |

By correlating the data in the above Table 3, the failure prediction system 107 may predict occurrence of a failure condition "Slowness", as the number of users increase. Therefore, the failure prediction system 107 may provide an actionable insight of "increasing capacity of the VDI environment 105", to the service provider i.e. enterprise "A". As a result, the failure prediction system 107 helps in solving the failure condition of "Slowness" at early stages, i.e. even before occurrence of the failure condition, based on prediction, which helps in avoiding potential failures that may occur in real-time. Thereby, improving user experience and productivity in the VDI environment 105.

Figure 3:
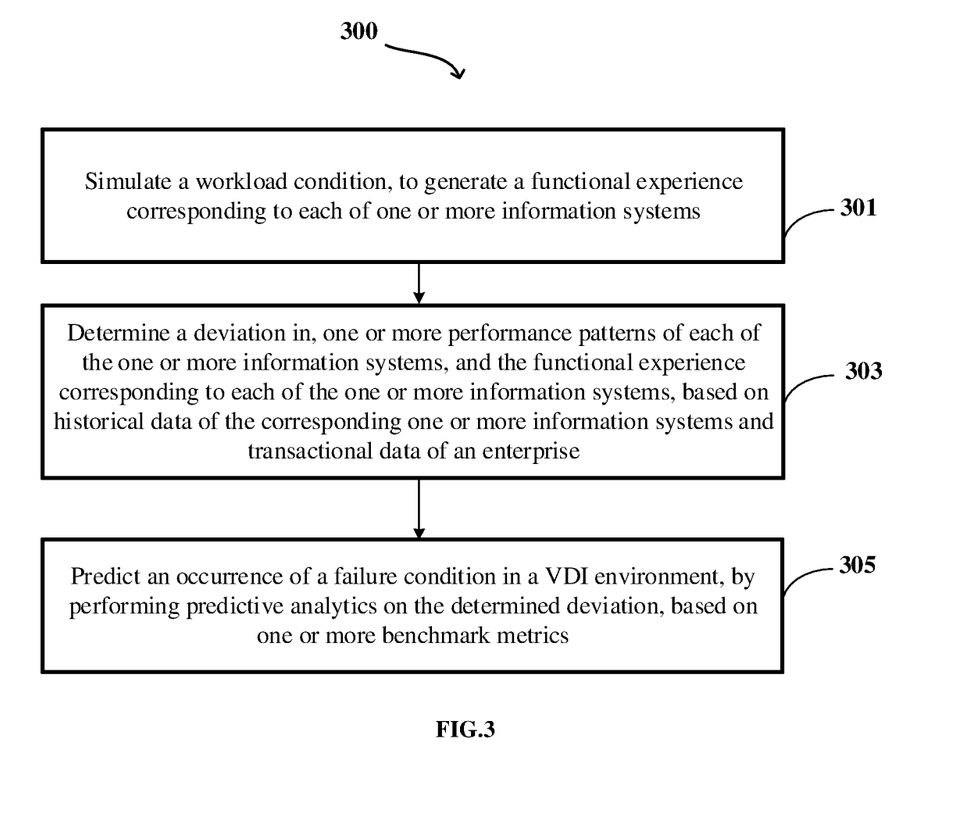
FIG. 3 shows a flowchart illustrating a method of predicting an occurrence of a failure condition in a Virtual Desktop Infrastructure (VDI) environment in accordance with some embodiments of the present disclosure.

FIG. 3 shows a flowchart illustrating method of predicting an occurrence of a failure condition in a Virtual Desktop Infrastructure (VDI) environment in accordance with some embodiments of the present disclosure.

As illustrated in FIG. 3, the method 300 comprises one or more blocks illustrating a method of predicting an occurrence of a failure condition in a Virtual Desktop Infrastructure (VDI) environment. The method 300 may be described in the general context of computer executable instructions. Generally, computer executable instructions can include routines, programs, objects, components, data structures, procedures, modules, and functions, which perform functions or implement abstract data types.

The order in which the method 300 is described is not intended to be construed as a limitation, and any number of the described method blocks can be combined in any order to implement the method 300. Additionally, individual blocks may be deleted from the methods without departing from the spirit and scope of the subject matter described herein. Furthermore, the method 300 can be implemented in any suitable hardware, software, firmware, or combination thereof.

At block 301, the method 300 may include simulating, by a processor 111 of a failure prediction system 107, a workload condition, to generate a functional experience corresponding to each of one or more information systems. In some embodiments, simulating the workload condition comprises performing one or more simulated end user transactions using the one or more information systems. The functional experience corresponding to each of the one or more information systems is quantified by a measure of time consumed at each virtualization layer, to execute each of the one or more simulated end user transactions. In some embodiments, the processor 111 may perform simulation at second predefined time intervals that may be set based on criticality of the one or more information systems to the enterprise.

At block 303, the method 300 may include determining, by the processor 111, a deviation in, one or more performance patterns of each of the one or more information systems, and the functional experience corresponding to each of the one or more information systems, based on historical data 209 of the corresponding one or more information systems and transactional data of an enterprise. In some embodiments, the one or more performance patterns of each of the one or more information systems performing transactions of each of the one or more end users 101, are determined dynamically, by continuously monitoring each of the one or more information systems used by one or more end users 101 of the enterprise.

At block 305, the method 300 may include predicting, by the processor 111, an occurrence of a failure condition in a VDI environment 105, by performing predictive analytics on the determined deviation, based on one or more benchmark metrics. Further, the processor 111 may generate one or more actionable insights upon predicting the occurrence of the failure condition in the VDI environment 105. Thereafter, the processor 111 may notify the one or more actionable insights to a service provider associated with the VDI environment 105, to prevent the occurrence of the failure condition in the VDI environment 105.

Figure 4:
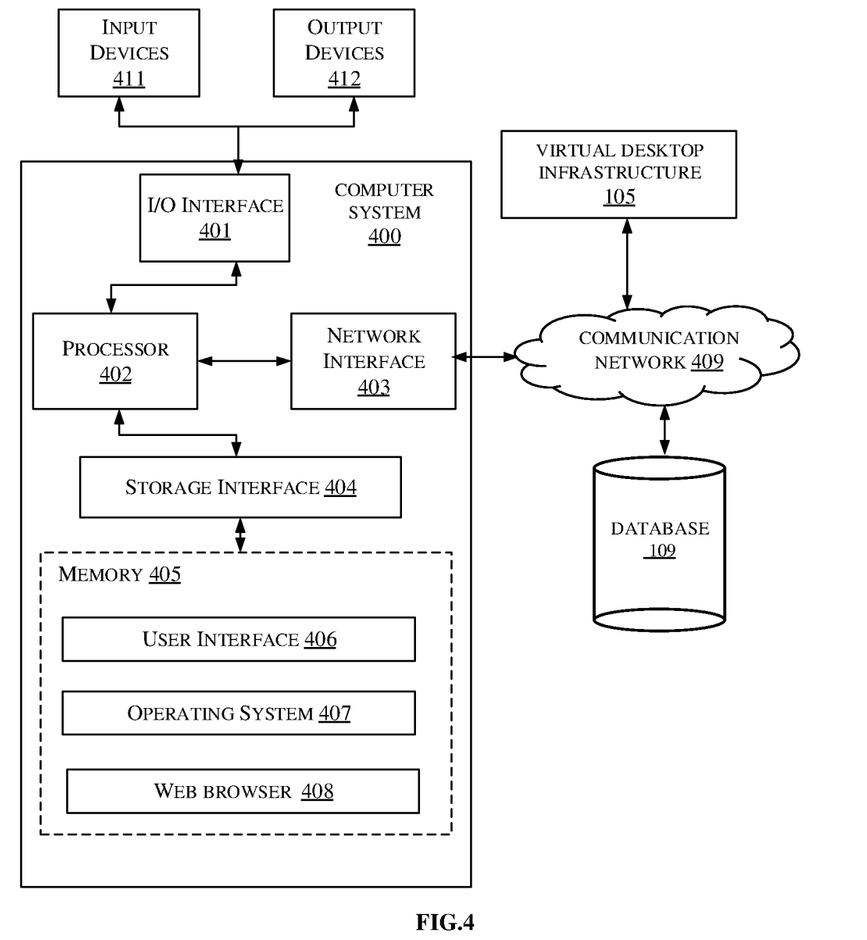
FIG. 4 is a block diagram of an exemplary computer system for implementing embodiments consistent with the present disclosure.

FIG. 4 is a block diagram of an exemplary computer system for implementing embodiments consistent with the present disclosure.

In some embodiments, FIG. 4 illustrates a block diagram of an exemplary computer system 400 for implementing embodiments consistent with the present invention. In some embodiments, the computer system 400 can be a failure prediction system 107 to predict an occurrence of a failure condition in a Virtual Desktop Infrastructure (VDI) environment 105. The computer system 400 may include a central processing unit ("CPU" or "processor") 402. The processor 402 may include at least one data processor for executing program components for executing user or system-generated business processes. A user may include a person, a person using a device such as those included in this invention, or such a device itself. The processor 402 may include specialized processing units such as integrated system (bus) controllers, memory management control units, floating point units, graphics processing units, digital signal processing units, etc.

The processor 402 may be disposed in communication with input devices 411 and output devices 412 via I/O interface 401. The I/O interface 401 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE), WiMax, or the like), etc.

Using the I/O interface 401, computer system 400 may communicate with input devices 411 and output devices 412.

In some embodiments, the processor 402 may be disposed in communication with a communication network 409 via a network interface 403. The network interface 403 may communicate with the communication network 409. The network interface 403 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 403 and the communication network 409, the computer system 400 may communicate with a VDI 105 and a database 109. The communication network 409 can be implemented as one of the different types of networks, such as intranet or Local Area Network (LAN), Closed Area Network (CAN) and such. The communication network 409 may either be a dedicated network or a shared network, which represents an association of the different types of networks that use a variety of protocols, for example, Hypertext Transfer Protocol (HTTP), CAN Protocol, Transmission Control Protocol/Internet Protocol (TCP/IP), Wireless Application Protocol (WAP), etc., to communicate with each other. Further, the communication network 409 may include a variety of network devices, including routers, bridges, servers, computing devices, storage devices, etc. In some embodiments, the processor 402 may be disposed in communication with a memory 405 (e.g., RAM, ROM, etc. not shown in FIG. 4) via a storage interface 404. The storage interface 404 may connect to memory 405 including, without limitation, memory drives, removable disc drives, etc., employing connection protocols such as Serial Advanced Technology Attachment (SATA), Integrated Drive Electronics (IDE), IEEE-1394, Universal Serial Bus (USB), fibre channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 405 may store a collection of program or database components, including, without limitation, a user interface 406, an operating system 407, a web browser 408 etc. In some embodiments, the computer system 400 may store user/application data, such as the data, variables, records, etc. as described in this invention. Such databases may be implemented as fault-tolerant, relational, scalable, secure databases such as Oracle or Sybase.

The operating system 407 may facilitate resource management and operation of the computer system 400. Examples of operating systems include, without limitation, APPLE® MACINTOSH® OS X®, UNIX®, UNIX-like system distributions (E.G., BERKELEY SOFTWARE DISTRIBUTION® (BSD), FREEBSD®, NETBSD®, OPENBSD, etc.), LINUX® DISTRIBUTIONS (E.G., RED HAT®, UBUNTU®, KUBUNTU®, etc.), IBM® OS/2®, MICROSOFT® WINDOWS® (XP®, VISTA/7/8, 10 etc.), APPLE® IOS®, GOOGLE™ ANDROID™, BLACKBERRY® OS, or the like. The User interface 406 may facilitate display, execution, interaction, manipulation, or operation of program components through textual or graphical facilities. For example, user interfaces may provide computer interaction interface elements on a display system operatively connected to the computer system 400, such as cursors, icons, checkboxes, menus, scrollers, windows, widgets, etc. Graphical User Interfaces (GUIs) may be employed, including, without limitation, Apple® Macintosh® operating systems' Aqua®, IBM® OS/2®, Microsoft® Windows® (e.g., Aero, Metro, etc.), web interface libraries (e.g., ActiveX®, Java®, Javascript®, AJAX, HTML, Adobe® Flash®, etc.), or the like.

In some embodiments, the computer system 400 may implement the web browser 408 stored program components. The web browser 408 may be a hypertext viewing application, such as MICROSOFT® INTERNET EXPLORER®, GOOGLE™ CHROME™, MOZILLA® FIREFOX®, APPLE® SAFARI®, etc. Secure web browsing may be provided using Secure Hypertext Transport Protocol (HTTPS), Secure Sockets Layer (SSL), Transport Layer Security (TLS), etc. Web browsers 408 may utilize facilities such as AJAX, DHTML, ADOBE® FLASH®, JAVASCRIPT®, JAVA®, Application Programming Interfaces (APIs), etc. In some embodiments, the computer system 400 may implement a mail server stored program component. The mail server may be an Internet mail server such as Microsoft Exchange, or the like. The mail server may utilize facilities such as Active Server Pages (ASP), ACTIVEX®, ANSI® C++/C #, MICROSOFT®, .NET, CGI SCRIPTS, JAVA®, JAVASCRIPT®, PERL®, PHP, PYTHON®, WEBOBJECTS®, etc. The mail server may utilize communication protocols such as Internet Message Access Protocol (IMAP), Messaging Application Programming Interface (MAPI), MICROSOFT® exchange, Post Office Protocol (POP), Simple Mail Transfer Protocol (SMTP), or the like. In some embodiments, the computer system 400 may implement a mail client stored program component. The mail client may be a mail viewing application, such as APPLE® MAIL, MICROSOFT® ENTOURAGE®, MICROSOFT® OUTLOOK®, MOZILLA® THUNDERBIRD®, etc.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

A description of an embodiment with several components in communication with each other does not imply that all such components are required. On the contrary a variety of optional components are described to illustrate the wide variety of possible embodiments of the invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the invention need not include the device itself.

The specification has described a method and a system for predicting an occurrence of a failure condition in a Virtual Desktop Infrastructure (VDI) environment. The illustrated steps are set out to explain the exemplary embodiments shown, and it should be anticipated that on-going technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Finally, the language used in the specification has been principally selected for readability and instructional purposes, and it may not have been selected to delineate or circumscribe the inventive subject matter. It is therefore intended that the scope of the invention be limited not by this

| Reference Number | Description |
| --- | --- |
| 100 | Architecture |
| 101 | One or more end users |
| 103 | One or more computing devices |
| 105 | Virtual Desktop Infrastructure |
| 107 | Failure prediction system |
| 109 | Database |
| 111 | Processor |
| 113 | I/O interface |
| 115 | Memory |
| 203 | Data |
| 205 | Modules |
| 207 | Transactional data |
| 209 | Historical data |
| 211 | Functional experience data |
| 213 | Performance data |
| 215 | Deviation data |
| 217 | Predicted data |
| 219 | Action data |
| 220 | Other data |
| 221 | Receiving module |
| 223 | Simulation module |
| 225 | Performance pattern determining module |
| 227 | Deviation determining module |
| 229 | Prediction module |
| 231 | Notifying module |
| 233 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User interface |
| 407 | Operating system |
| 408 | Web browser |
| 409 | Communication network |
| 411 | Input devices |
| 412 | Output devices |

What is claimed is:

1. A method of predicting an occurrence of a failure condition in a Virtual Desktop Infrastructure (VDI) environment, the method comprising:

simulating, by a failure prediction system, a workload condition, to generate a functional experience corresponding to each of one or more information systems, wherein simulating the workload condition comprises performing one or more simulated end user transactions using the one or more information systems;

determining, by the failure prediction system, a deviation in, one or more performance patterns of each of the one or more information systems, and the functional experience corresponding to each of the one or more information systems, based on historical data of the corresponding one or more information systems and transactional data of an enterprise, wherein the transactional data of the enterprise is obtained, from at least one virtualization layer, at first predefined time intervals; and predicting, by the failure prediction system, an occurrence of a failure condition in a VDI environment, by performing predictive analytics on the determined deviation, based on one or more benchmark metrics;

wherein the simulation is performed at second predefined time intervals, wherein the second predefined time intervals are set based on criticality of the one or more information systems to the enterprise.

2. The method as claimed in claim 1, wherein the transactional data is indicative of a workload pattern of the enterprise, wherein the transactional data comprises workload data related to at least one of, the one or more information systems, one or more servers hosting the one or more information systems, one or more service protocols and one or more communication gateways.

3. The method as claimed in claim 1, wherein the one or more performance patterns of each of the one or more information systems performing transactions of each of one or more end users of the enterprise, are determined dynamically, by continuously monitoring each of the one or more information systems used by the one or more end users of the enterprise.

4. The method as claimed in claim 1 further comprises:
generating, by the failure prediction system, one or more actionable insights upon predicting the occurrence of the failure condition in the VDI environment;
notifying, by the failure prediction system, the one or more actionable insights to a service provider associated with the VDI environment, to prevent the occurrence of the failure condition in the VDI environment.

5. The method as claimed in claim 1, wherein the one or more simulated end user transactions comprises at least one of application launch operation, login operation, read operation, write operation and submit operation.

6. The method as claimed in claim 1, wherein the functional experience corresponding to each of the one or more information systems is quantified by a measure of time consumed at each virtualization layer, to execute each of the one or more simulated end user transactions.

7. The method as claimed in claim 1, wherein the predictive analytics is performed using at least one statistical techniques related to data mining, predictive modelling and machine learning, wherein the one or more benchmark metrics are determined based on the historical data of the one or more information systems.

8. The method as claimed in claim 1, wherein the historical data of the one or more information systems comprises at least one of, one or more previously identified performance patterns, performance metrics, standard deviations, change in measurements within a time slot and baseline shifts related to the one or more information systems, determined while performing one or more tasks.

9. A failure prediction system for predicting an occurrence of a failure condition in a Virtual Desktop Infrastructure (VDI) environment, the failure prediction system comprising:

a processor; and a memory communicatively coupled to the processor, wherein the memory stores the processor-executable instructions, which, on execution, causes the processor to:

simulate a workload condition, to generate a functional experience corresponding to each of one or more information systems, wherein simulating the workload condition comprises performing one or more simulated end user transactions using the one or more information systems;

determine a deviation in, one or more performance patterns of each of the one or more information systems, and the functional experience corresponding to each of the one or more information systems, based on historical data of the corresponding one or more information systems and transactional data of an enterprise, wherein the processor is configured to obtain the transactional data of the enterprise, from at least one virtualization layer; and predict an occurrence of a failure condition in a VDI environment, by performing predictive analytics on the determined deviation, based on one or more benchmark metrics;

wherein the processor performs simulation at second predefined time intervals, wherein the second predefined time intervals are set based on criticality of the one or more information systems to the enterprise.

10. The failure prediction system as claimed in claim 9, at first predefined time intervals, wherein the transactional data is indicative of a workload pattern of the enterprise, wherein the transactional data comprises workload data related to at least one of, the one or more information systems, one or more servers hosting the one or more information systems, one or more service protocols and one or more communication gateways.

11. The failure prediction system as claimed in claim 9, wherein the one or more performance patterns of each of the one or more information systems performing transactions of each of one or more end users of the enterprise, are determined dynamically, by continuously monitoring each of the one or more information systems used by the one or more end users of the enterprise.

12. The failure prediction system as claimed in claim 9, wherein the processor is further configured to:

generate one or more actionable insights upon predicting the occurrence of the failure condition in the VDI environment;

notify the one or more actionable insights to a service provider associated with the VDI environment, to prevent the occurrence of the failure condition in the VDI environment.

13. The failure prediction system as claimed in claim 9, wherein the one or more simulated end user transactions comprises at least one of application launch operation, login operation, read operation, write operation and submit operation.

14. The failure prediction system as claimed in claim 9, wherein the functional experience corresponding to each of the one or more information systems is quantified by a measure of time consumed at each virtualization layer, to execute each of the one or more simulated end user transactions.

15. The failure prediction system as claimed in claim 9, wherein the processor performs the predictive analytics using at least one statistical techniques related to data mining, predictive modelling and machine learning, wherein the one or more benchmark metrics used for performing predictive analytics are determined based on the historical data of the one or more information systems.

16. The failure prediction system as claimed in claim 9, wherein the historical data of the one or more information systems comprises at least one of, one or more previously identified performance patterns, performance metrics, standard deviations, change in measurements within a time slot and baseline shifts related to the one or more information systems, determined while performing one or more tasks.

17. A non-transitory computer readable medium including instructions stored thereon that when processed by at least one processor causes a failure prediction system to perform operations comprising:

simulating a workload condition, to generate a functional experience corresponding to each of one or more information systems, wherein simulating the workload condition comprises performing one or more simulated end user transactions using the one or more information systems;

determining a deviation in, one or more performance patterns of each of the one or more information systems, and the functional experience corresponding to each of the one or more information systems, based on historical data of the corresponding one or more information systems and transactional data of an enterprise, wherein the transactional data of the enterprise is obtained, from at least one virtualization layer, at first predefined time intervals; and predicting an occurrence of a failure condition in a VDI environment, by performing predictive analytics on the determined deviation, based on one or more benchmark metrics;

wherein the simulation is performed at second predefined time intervals, wherein the second predefined time intervals are set based on criticality of the one or more information systems to the enterprise.

\* \* \* \* \*